(12) United States Patent
Komatsu et al.

(10) Patent No.: US 10,379,634 B2
(45) Date of Patent: Aug. 13, 2019

(54) INFORMATION PROCESSING APPARATUS AND BASE MEMBER

(71) Applicant: FUJITSU CLIENT COMPUTING LIMITED, Kawasaki-shi, Kanagawa (JP)

(72) Inventors: Ryu Komatsu, Kawasaki (JP); Takashi Abe, Kawasaki (JP)

(73) Assignee: Fujitsu Client Computing Limited (JP)

( * ) Notice: Subject to any disclaimer, the term of this patent is extended or adjusted under 35 U.S.C. 154(b) by 0 days.

(21) Appl. No.: 15/236,020

(22) Filed: Aug. 12, 2016

(65) Prior Publication Data

US 2017/0052611 A1    Feb. 23, 2017

(30) Foreign Application Priority Data

Aug. 19, 2015  (JP) .................................. 2015-162188

(51) Int. Cl.
| | |
|---|---|
| *G06F 1/16* | (2006.01) |
| *G06F 3/0354* | (2013.01) |
| *G06F 3/038* | (2013.01) |
| *G06F 3/02* | (2006.01) |

(52) U.S. Cl.
CPC .......... *G06F 3/03547* (2013.01); *G06F 3/038* (2013.01); *G06F 1/16* (2013.01); *G06F 3/02* (2013.01)

(58) Field of Classification Search
None
See application file for complete search history.

(56) References Cited

U.S. PATENT DOCUMENTS

| | | | |
|---|---|---|---|
| 8,139,347 B2* | 3/2012 | Chiang | .................. G06F 1/169 361/679.18 |
| 8,174,846 B2* | 5/2012 | Hamada | .............. G06F 3/03547 361/728 |

(Continued)

FOREIGN PATENT DOCUMENTS

| | | |
|---|---|---|
| JP | 2008-009904 A | 1/2008 |
| JP | 2011-081668 | 4/2011 |
| JP | 2011-221857 A | 11/2011 |

OTHER PUBLICATIONS

Notice of Allowance for JP Application No. 2015-162188, dated Oct. 30, 2018 (6 pages).

*Primary Examiner* — Courtney L Smith
*Assistant Examiner* — Rashen E Morrison
(74) *Attorney, Agent, or Firm* — Harness, Dickey & Pierce, P.L.C.

(57) ABSTRACT

An information processing apparatus includes: a touchpad module; a cover including a touch operation portion configured to cover a face of the touchpad module and a button opening formed along a horizontal side portion of the touch operation portion; an operation button arranged in the button opening; and a base member, arranged on an opposite side of the cover with respect to the touchpad module and the operation button, configured to support the touchpad module and the operation button, an end portion of the base member on the touchpad module side being arranged closer to the operation button than a central portion in a vertical side direction of the touchpad module when viewed from a thickness direction of the touchpad module.

14 Claims, 8 Drawing Sheets

(56) References Cited

U.S. PATENT DOCUMENTS

| | | | | |
|---|---|---|---|---|
| 8,564,938 B2* | 10/2013 | Horii | ........................ | H05K 7/02 |
| | | | | 361/679.01 |
| 8,692,146 B2* | 4/2014 | Mihara | .................... | G06F 1/169 |
| | | | | 200/314 |
| 8,803,852 B2* | 8/2014 | Tsai | ..................... | G06F 3/03547 |
| | | | | 345/173 |
| 8,811,024 B2* | 8/2014 | Wei | ......................... | G06F 1/169 |
| | | | | 361/679.18 |
| 8,866,033 B2* | 10/2014 | Xue | ........................ | G06F 1/169 |
| | | | | 200/343 |
| 8,964,378 B2* | 2/2015 | Kao | ...................... | G06F 1/1613 |
| | | | | 345/173 |
| 9,093,235 B2* | 7/2015 | Su | .......................... | H01H 13/14 |
| 2006/0022957 A1* | 2/2006 | Lee | .................... | G06F 3/03547 |
| | | | | 345/173 |
| 2007/0144885 A1* | 6/2007 | Nakatani | ............... | G06F 1/1616 |
| | | | | 200/520 |
| 2011/0249383 A1 | 10/2011 | Horii et al. | | |
| 2011/0254787 A1* | 10/2011 | Cheng | ................. | G06F 3/03543 |
| | | | | 345/173 |
| 2011/0254788 A1* | 10/2011 | Wang | ...................... | G06F 1/169 |
| | | | | 345/173 |
| 2013/0234938 A1* | 9/2013 | Xue | .................... | G06F 3/03547 |
| | | | | 345/158 |
| 2013/0328785 A1* | 12/2013 | Brooks | ................. | G06F 1/1658 |
| | | | | 345/170 |

* cited by examiner ized personal computer, includes, for example, a touchpad
INFORMATION PROCESSING APPARATUS AND BASE MEMBER

CROSS-REFERENCE TO RELATED APPLICATION

This application is based upon and claims the benefit of priority of the prior Japanese Patent Application No. 2015-162188, filed on Aug. 19, 2015, the entire contents of which are incorporated herein by reference.

FIELD

The embodiment discussed herein is related to an information processing apparatus and a base member.

BACKGROUND

There is provided a notebook-size personal computer including a touchpad module.

Japanese Laid-open Patent Publication No. 2011-081668 discloses related art.

SUMMARY

According to an aspect of the embodiments, an information processing apparatus includes: a touchpad module; a cover including a touch operation portion configured to cover a face of the touchpad module and a button opening formed along a horizontal side portion of the touch operation portion; an operation button arranged in the button opening; and a base member, arranged on an opposite side of the cover with respect to the touchpad module and the operation button, configured to support the touchpad module and the operation button, an end portion of the base member on the touchpad module side being arranged closer to the operation button than a central portion in a vertical side direction of the touchpad module when viewed from a thickness direction of the touchpad module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An information processing apparatus, such as a notebook-size personal computer, includes, for example, a touchpad module, a cover having a touch operation portion which covers an obverse face of the touchpad module, and operation buttons which are formed along horizontal side portions of the touch operation portion. In the information processing apparatus of this type, the operation buttons are attached to the cover, for example, via a base member.

For example, a button opening is formed in the cover to expose the operation buttons. The button opening is formed along the horizontal side portions of the touch operation portion. For this reason, the amount of flexure (the amount of sinking) of the horizontal side portion on the button opening side in the touch operation portion may increase, for example, if the touch operation portion is pressed by an operator.

To cope with this, a reverse face of the touchpad module may be entirely covered by, for example, the base member that supports the operation buttons. If the touch operation portion is pressed by an operator in this case, the touch operation portion is supported by the base member via the touchpad module. This reduces the amount of flexure of the horizontal side portion on the button opening side of the touch operation portion.

The above-described measures, however, may reduce a mounting region for an electronic component relative to the reverse face of the touchpad module.

Figure 1:
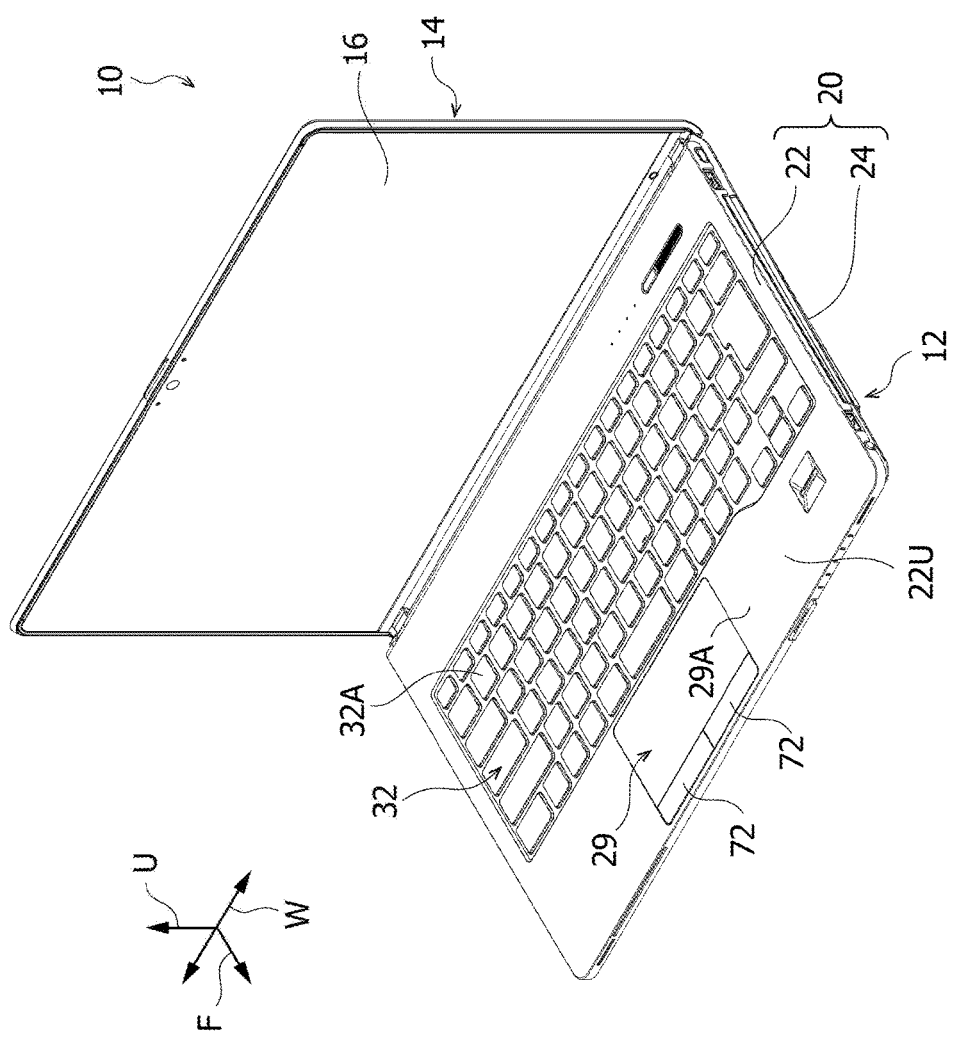
FIG. 1 illustrates an example of a perspective view of an information processing apparatus as viewed from obliquely above.

As illustrated in FIG. 1, an information processing apparatus 10 may be, for example, a notebook-size personal computer. The information processing apparatus 10 includes a main body device (fixed device) 12 and a display device (movable device) 14 which is pivotably coupled to the main body device 12. The display device 14 is provided with a display 16, such as a liquid crystal display. The display device 14 transits between a state in which the display device 14 is closed to the main body device 12 side and a state in which the display device 14 is opened away from the main body device 12.

FIG. 1 illustrates the state, in which the display device 14 is opened away from the main body device 12. Arrows U, F, and W in the drawings indicate an upper side in a height direction, a front side in a front-back direction (near side in a depth direction), and a width direction, respectively, of the information processing apparatus 10.

The main body device 12 has a case 20. The case 20 is a low-profile housing and is formed in a rectangular shape in plan view. The case 20 has an upper cover 22 and a lower cover 24, into which the case 20 is divided in a thickness direction of the main body device 12 (the height direction of the information processing apparatus 10).

Figure 2:
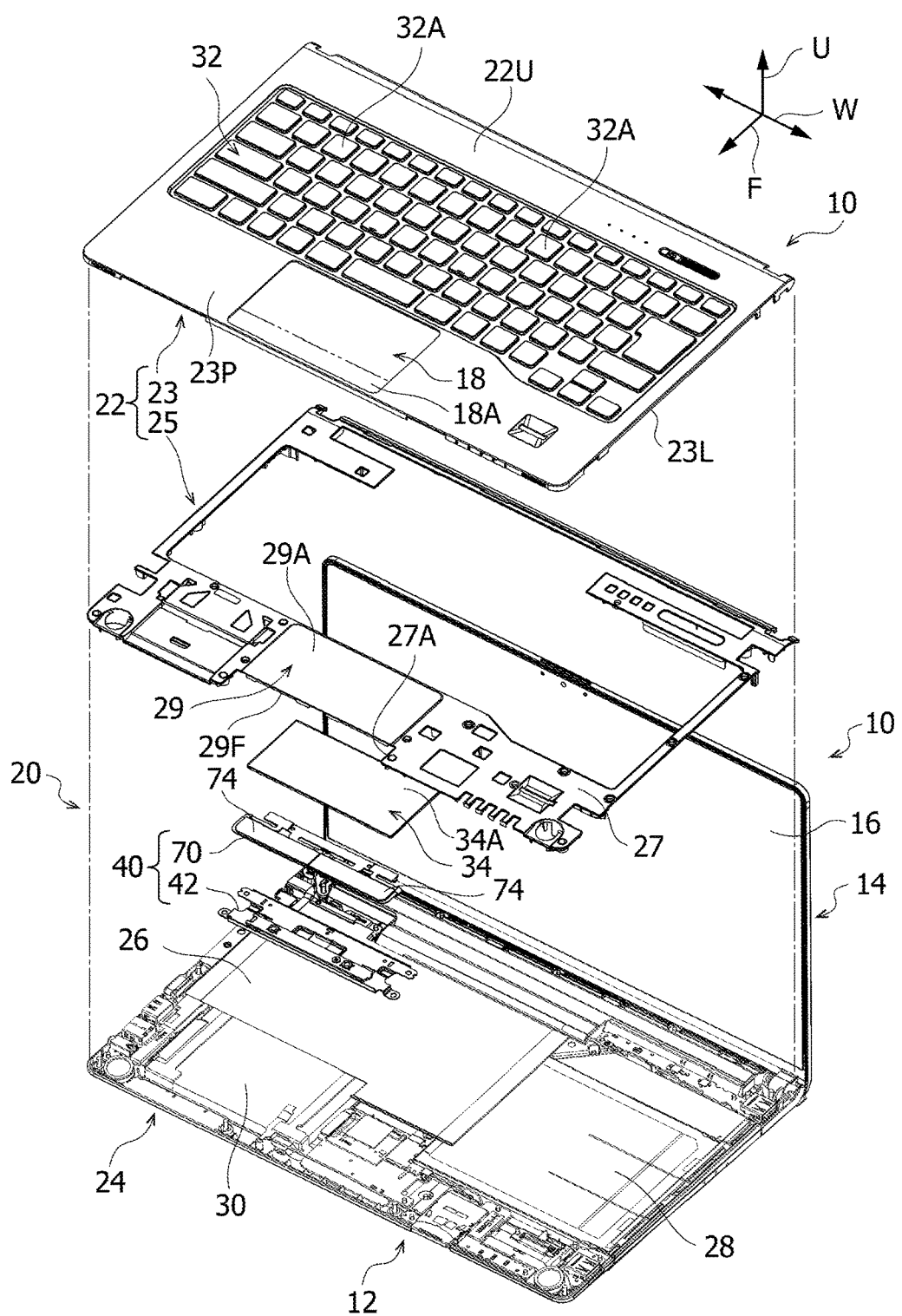
FIG. 2 illustrates an example of an exploded perspective view of the information processing apparatus as viewed from obliquely above.

As illustrated in FIG. 2, for example, a printed board (main board) 26, an optical disk drive unit 28, and a hard disk drive unit 30 are provided inside the case 20. The case 20 is also provided with a keyboard 32, a touchpad module 34, a button unit 40, and the like.

The keyboard 32 is formed in a rectangular shape in plan view and is arranged to extend from a central portion to a rear side in a front-back direction of the upper cover 22. The keyboard 32 has a plurality of keytops 32A which are exposed from an upper surface 22U of the upper cover 22.

For example, the upper cover 22 has a cover main body 23 and a cover frame 25 which is arranged on the reverse face 23L side of the cover main body 23 (the lower cover 24 side). The cover main body 23 may be made of metal and is formed in a rectangular shape in plan view. A plurality of openings which expose the plurality of keytops 32A are formed in the cover main body 23. The cover main body 23 does not have to be made of metal and may be made of resin. The upper cover 22 may be an example of a cover.

A part on a front side (a side pointed to by the arrow F) in the keyboard 32 in the cover main body 23 is a palm rest portion 23P. In the palm rest portion 23P, an opening 18 for a touch operation portion 29 and the button unit 40 is formed. The opening 18 is formed in a rectangular shape in plan view.

The cover frame 25 may be made of resin. The cover frame 25 is formed in the form of a frame along an outer peripheral portion of the cover main body 23 and is joined to the reverse face 23L of the cover main body 23. The keyboard 32 is arranged inside the cover frame 25. The cover frame 25 has a panel-like portion 27 which is arranged along the palm rest portion 23P of the cover main body 23. The panel-like portion 27 is formed in an oblong shape with a width direction of the upper cover 22 (a direction of the arrow W) as a longitudinal direction in plan view and forms a front-side frame portion of the cover frame 25.

Figure 3:
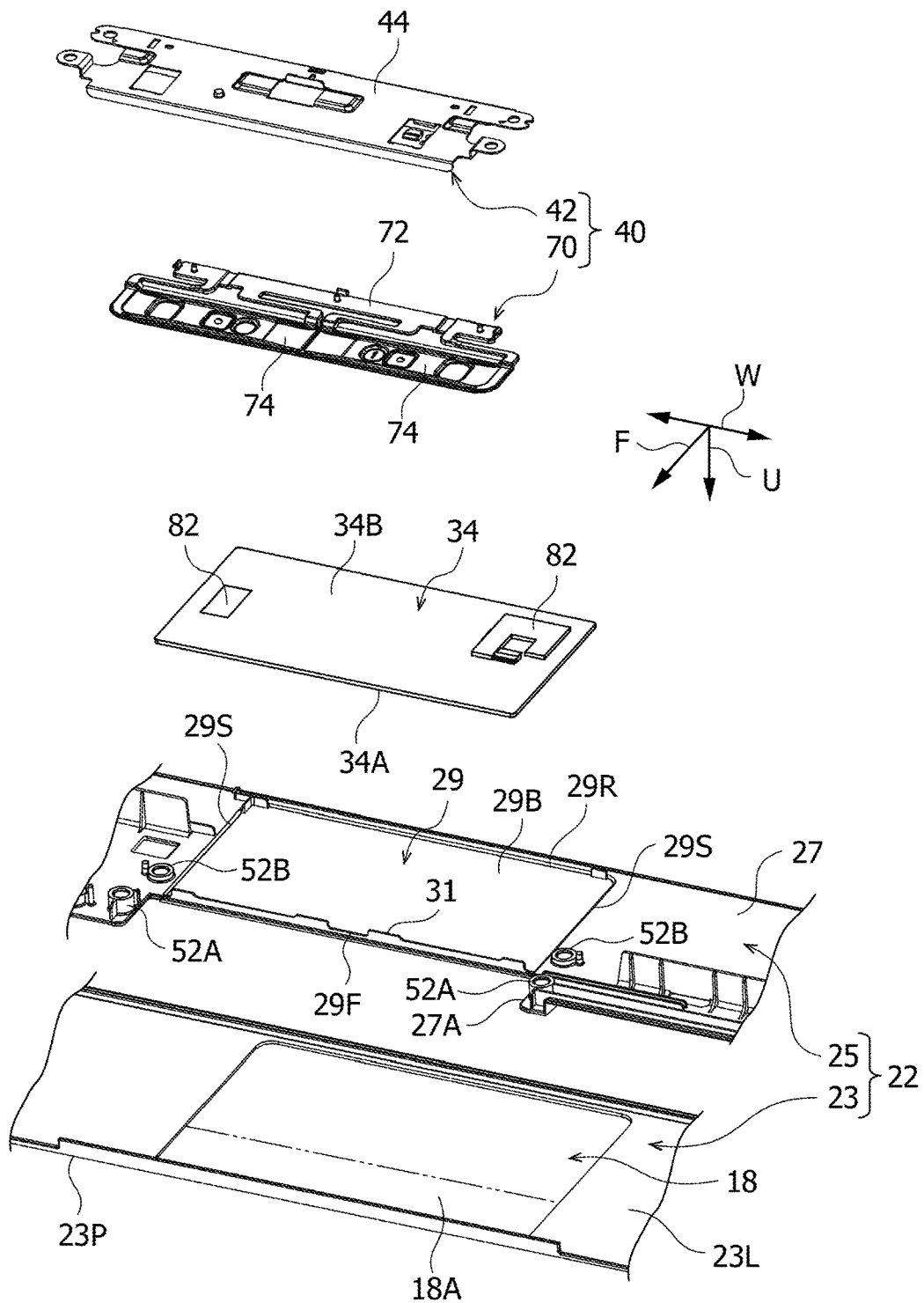
FIG. 3 illustrates an example of an enlarged perspective view of an upper cover, a touchpad module, a button member, and a click base as viewed from obliquely below.

A central portion in a longitudinal direction of the panel-like portion 27 is the touch operation portion 29 in the form of a flat plate. The touch operation portion 29 is formed in a rectangular shape with the width direction of the upper cover 22 as a longitudinal direction when viewed from a thickness direction of the touch operation portion 29 (a direction of the arrow U). As illustrated in FIG. 3, the touch operation portion 29 illustrated in FIG. 2 has one pair of horizontal side portions 29F and 29R on two sides in the front-back direction of the upper cover 22 and one pair of vertical side portions 29S on two sides in the width direction of the upper cover 22. For example, the width direction of the upper cover 22 (the direction of the arrow W) may coincide with a horizontal side direction of the touch operation portion 29, and the front-back direction of the upper cover 22 (a direction of the arrow F) may coincide with a vertical side direction of the touch operation portion 29.

A notch 27A is formed on a front side of the touch operation portion 29 in the panel-like portion 27. The notch 27A is formed along the horizontal side portion 29F on the front side of the touch operation portion 29 (a side pointed to by the arrow F). One pair of click buttons 74 (to be described later) is arranged in the notch 27A.

The touch operation portion 29 is arranged so as to cover a rear side (on a side opposite to the side pointed to by the arrow F) of the opening 18 in the cover main body 23. For example, the touch operation portion 29 is arranged so as to cover the opening 18 in the cover main body 23 except a button opening 18A. For this reason, the button opening 18A is formed along the horizontal side portion 29F on the front side of the touch operation portion 29.

An obverse face of the touch operation portion 29 may be a touch operation surface 29A (see FIG. 2) which is exposed from the opening 18 and is touched and operated by an operator. A rib portion 31 which protrudes toward a click base 42 is provided at the horizontal side portion 29F on the button opening 18A side in the touch operation portion 29. A distal end portion 31A in a protruding direction of the rib portion 31 is brought into contact with a base main body portion 44 of the click base 42 when the touch operation portion 29 is pressed by an operator.

Figure 4:
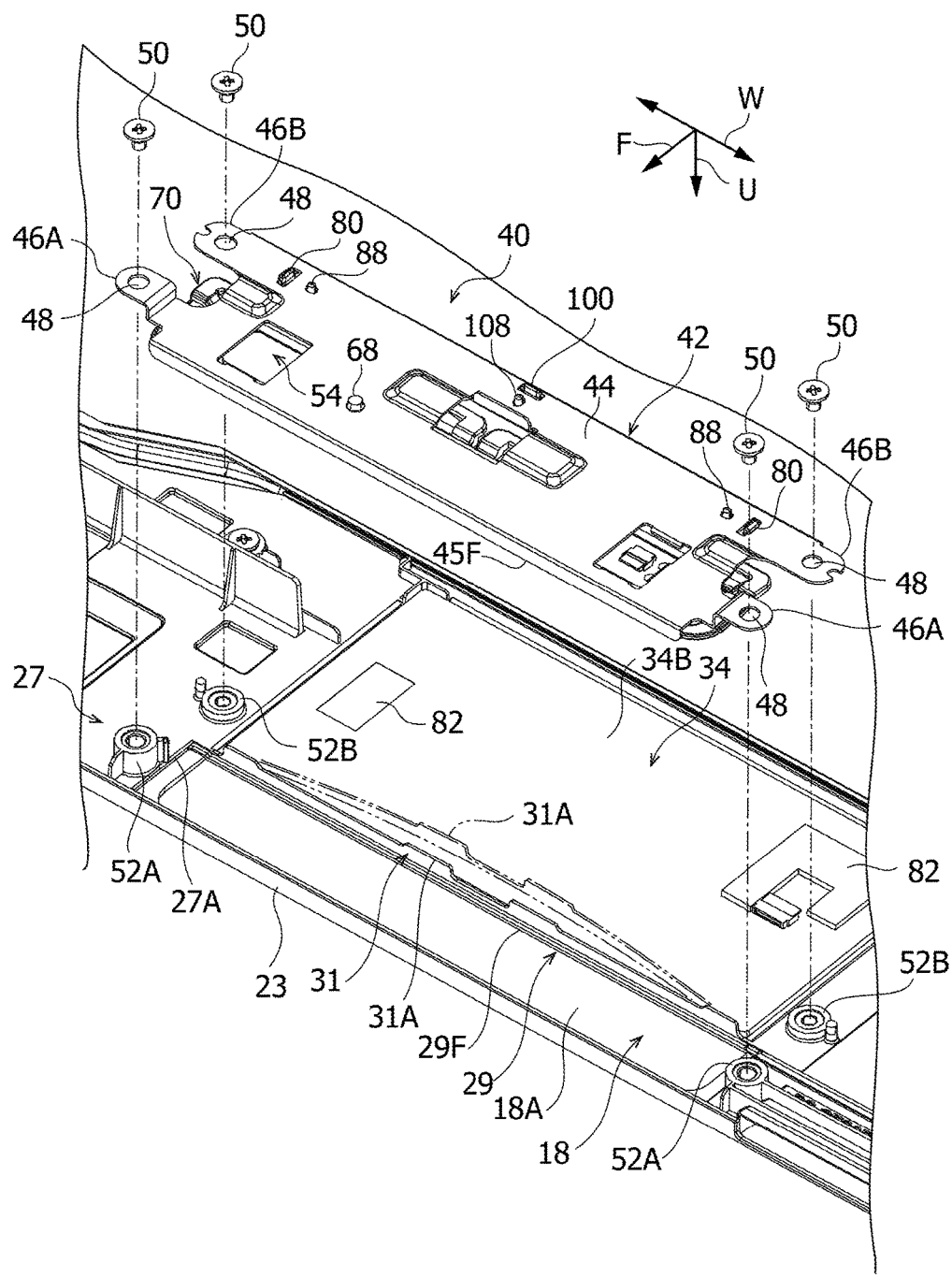
FIG. 4 illustrates an example of an exploded perspective view of the upper cover and a button unit as viewed from obliquely below.

As illustrated in FIGS. 3 and 4, the touchpad module 34 is arranged on the reverse face 29B side of the touch operation portion 29. For example, an electrical capacitance sensor which detects a touch operation of the touch operation portion 29 (the touch operation surface 29A) by an operator is mounted on the touchpad module 34. The touchpad module 34 is electrically connected to, for example, the printed board 26 described earlier and outputs a piece of information on a detected touch operation by an operator to the printed board 26.

The touchpad module 34 is, for example, formed in a rectangular shape with the width direction of the upper cover 22 as a longitudinal direction when viewed from a thickness direction of the touchpad module 34 (the direction of the arrow U). An obverse face 34A on the touch operation portion 29 side in the touchpad module 34 may be a sensor surface which detects a touch operation of the touch operation portion 29 by an operator. The obverse face 34A (see FIG. 3) of the touchpad module 34 is joined to the reverse face 29B of the touch operation portion 29 while the obverse face 34A is in close contact with the reverse face 29B of the touch operation portion 29. The obverse face 34A of the touchpad module 34 is bonded to the reverse face 29B of the touch operation portion 29 with adhesive, such as double-faced tape. A plurality of electronic components 82 are mounted on a reverse face 34B on the click base 42 side in the touchpad module 34.

The touch operation portion 29 made of resin may be used to inhibit a reduction in the sensor sensitivity of the touchpad module 34. A horizontal side direction and a vertical side direction of the touchpad module 34 may coincide with the horizontal side direction (the direction of the arrow W) and the vertical side direction (the direction of the arrow U) of the touch operation portion 29.

Figure 5:
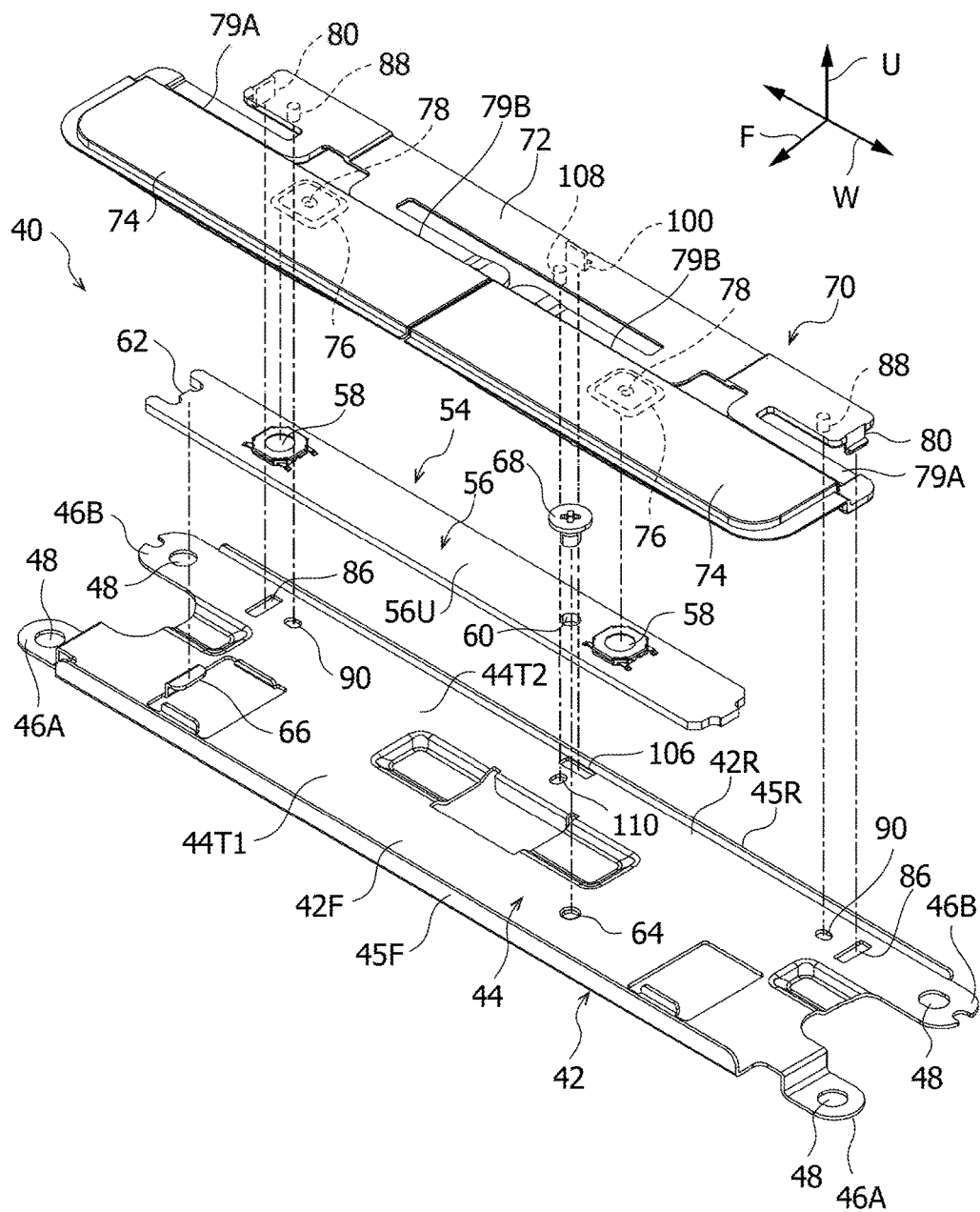
FIG. 5 illustrates an example of an exploded perspective view of the button unit as viewed from obliquely above.

The button unit 40 is arranged along a front-side end portion of the upper cover 22. As illustrated in FIG. 5, the button unit 40 illustrated in FIG. 3 has the click base 42, a switch unit 54, and a button member 70. The click base 42 may be an example of a base member.

The click base 42 is fixed to the upper cover 22 with screws 50 (see FIG. 4) while the switch unit 54 and the button member 70 are assembled thereto. For example, the switch unit 54 and the button member 70 are fixed to the case 20 via the click base 42.

As illustrated in FIG. 4, the click base 42 is made of, for example, metal and is formed in an oblong shape with the width direction of the upper cover 22 (the direction of the arrow W) as a longitudinal direction when viewed from the thickness direction of the touchpad module 34 (the direction of the arrow U). The click base 42 is arranged to extend across the touchpad module 34 and the button opening 18A when viewed from the thickness direction of the touchpad module 34.

As illustrated in FIG. 5, the click base 42 has the base main body portion 44, one pair of front-side fixed portions 46A, and one pair of rear-side fixed portions 46B. The base main body portion 44 is formed in the form of a flat plate. The one pair of front-side fixed portions 46A and the one pair of rear-side fixed portions 46B are provided at end portions on two sides in a longitudinal direction of the base main body portion 44. Through-holes 48, through which the screws 50 penetrate, are respectively formed in the one pair of front-side fixed portions 46A and the one pair of rear-side fixed portions 46B. The one pair of front-side fixed portions 46A may be an example of first fixed portions while the one pair of the rear-side fixed portions 46B may be an example of second fixed portions.

As illustrated in FIG. 4, the upper cover 22 illustrated in FIG. 3 is provided with one pair of front-side boss portions 52A and one pair of rear-side boss portions 52B. The one pair of front-side boss portions 52A is arranged on two sides in a longitudinal direction of the button opening 18A. The one pair of rear-side boss portions 52B is arranged on two sides in a longitudinal direction of the touchpad module 34. The one pair of front-side fixed portions 46A and the one pair of rear-side fixed portions 46B are fixed to the one pair of front-side boss portions 52A and the one pair of rear-side boss portions 52B, respectively, with the screws 50. By way of example, the one pair of front-side fixed portions 46A, together with the lower cover 24 (see FIG. 2), may be fixed to the one pair of front-side boss portions 52A with the screws 50.

As illustrated in FIG. 5, a switch-fixed region 44T1 where the switch unit 54 is fixed and a button-fixed region 44T2 where a button base 72 is fixed are provided on an obverse face on the button member 70 side in the base main body portion 44. Wall portions 45F and 45R which extend toward the click button 74 are respectively formed at end portions on two sides in a lateral direction of the base main body portion 44 (the direction of the arrow F) and, more specifically, end portions 42F and 42R on two sides in a lateral direction of the click base 42.

The switch unit 54 has a switch board 56 and one pair of switches 58. The switch board 56 is formed in an oblong shape extending in a longitudinal direction of the click base 42. The switch board 56 is arranged along the switch-fixed region 44T1 of the base main body portion 44. A fixing hole 60, through which a screw 68 penetrates, is formed on one end side in a longitudinal direction of the switch board 56. A protruding portion 62 is provided on the other end side in the longitudinal direction of the switch board 56.

A screw hole 64 is formed on one end side in a longitudinal direction of the switch-fixed region 44T1. A hook portion 66 is formed on the other end side in the longitudinal direction of the switch-fixed region 44T1. The switch board 56 is laid on the click base 42 while the protruding portion 62 of the switch board 56 is hooked on to the hook portion 66. In this state, the screw 68 is inserted into the screw hole 64 through the fixing hole 60 of the switch board 56. In the above-described manner, the switch board 56 is fixed to the switch-fixed region 44T1.

The one pair of switches 58 is mounted on a mounting surface 56U on a side opposite to the click base 42 side (the upper cover 22 side) in the switch board 56. The one pair of switches 58 is spaced in the longitudinal direction of the switch board 56 and is arranged to face push portions 78 of the one pair of click buttons 74.

Each switch 58 may be, for example, a tactile switch, such as a dome switch. For example, each switch 58 has a contact spring, a stationary contact, and a movable contact. The contact spring bends the other way upon a press operation by an operator to give a tactile feel to the operator. The contact spring is provided with the movable contact. The movable contact is brought into contact with the stationary contact upon a press operation by an operator. This puts the switch 58 into an on state (an energized state). When the movable contact separates from the stationary contact, the switch 58 is put into an off state (a non-energized state). The one pair of switches 58 may be electrically connected to, for example, the printed board 26 via a cable (not illustrated) connected to the switch board 56.

The button member 70 has the button base 72, the one pair of click buttons 74, and a plurality of support arms 79A and 79B. The button base 72, the one pair of click buttons 74, and the plurality of support arms 79A and 79B may be integrally formed using, for example, a resin having elasticity (a rubbery property). The button base 72 is formed in an oblong shape extending in the longitudinal direction of the click base 42 and is fixed to the button-fixed region 44T2 of the click base 42.

For example, the button base 72 and the switch board 56 are assembled together while the button base 72 and the switch board 56 are laid on top of each other. One pair of first lug members 80 which extend toward the click base 42 is provided at end portions on two sides in a longitudinal direction of the button base 72. The one pair of first lug members 80 is inserted into first mounting holes 86 which are formed on two sides in the longitudinal direction of the click base 42. The one pair of first lug members 80 is made to engage with edge portions of the first mounting holes 86, thereby fixing the end portions on the two sides in the longitudinal direction of the button base 72 to the click base 42.

A second lug member 100 which extends toward the click base 42 is provided at an end portion on a side opposite to a side with the one pair of click buttons 74 in a central portion in the longitudinal direction of the button base 72. The second lug member 100 is inserted into a second mounting hole 106 which is formed in a central portion in the longitudinal direction of the click base 42. The second lug member 100 is made to engage with an edge portion of the second mounting hole 106, thereby fixing the central portion in the longitudinal direction of the button base 72 to the click base 42.

One pair of first locating protruding portions 88 and a second locating protruding portion 108 which locate the button member 70 with respect to the click base 42 are provided at the button base 72. The one pair of first locating protruding portions 88 and the second locating protruding portion 108 are inserted into one pair of first locating holes 90 and a second locating hole 110, respectively, which are formed in the click base 42, thereby locating the button base 72 with respect to the click base 42.

The one pair of click buttons 74 is arranged side by side in the longitudinal direction of the click base 42 and are each formed in an oblong shape extending in the longitudinal direction of the click base 42. The one pair of click buttons 74 is made to face the switch-fixed region 44T1 of the click base 42 across the switch unit 54. The one pair of click buttons 74 is arranged in the button opening 18A (see FIG. 4) of the upper cover 22 and is exposed from the upper surface 22U of the upper cover 22.

A recessed portion 76 which faces the switch 58 is formed in a central portion of a reverse face (a surface on the switch unit 54 side) of each click button 74. The push portion 78 that faces a central portion of the switch 58 is formed at a central portion of the recessed portion 76. The push portion 78 protrudes as a protrusion from a bottom wall portion of the recessed portion 76.

Each click button 74 is connected to the button base 72 via one pair of support arms 79A and 79B. The one pair of support arms 79A and 79B extends from the button base 72 toward the click button 74 and is connected to one end side (a rear side) in a lateral direction of the click button 74. With one pair of support arms 79A and 79B, each click button 74 is supported by the button base 72 in a cantilever fashion. The one pair of support arms 79A and 79B may be an example of elastic support portions.

The one pair of support arms 79A and 79B is elastically deformed in a direction in which the one pair of click buttons 74 and the click base 42 face each other (the height direction of the information processing apparatus 10). With the elastic deformation of the one pair of support arms 79A and 79B, the push portion 78 of each click button 74 comes into and out of contact with the switch 58. At this time, the push portion 78 of the click button 74 presses the central portion of the switch 58, and the switch 58 is temporarily switched from an off state to an on state.

Figure 6:
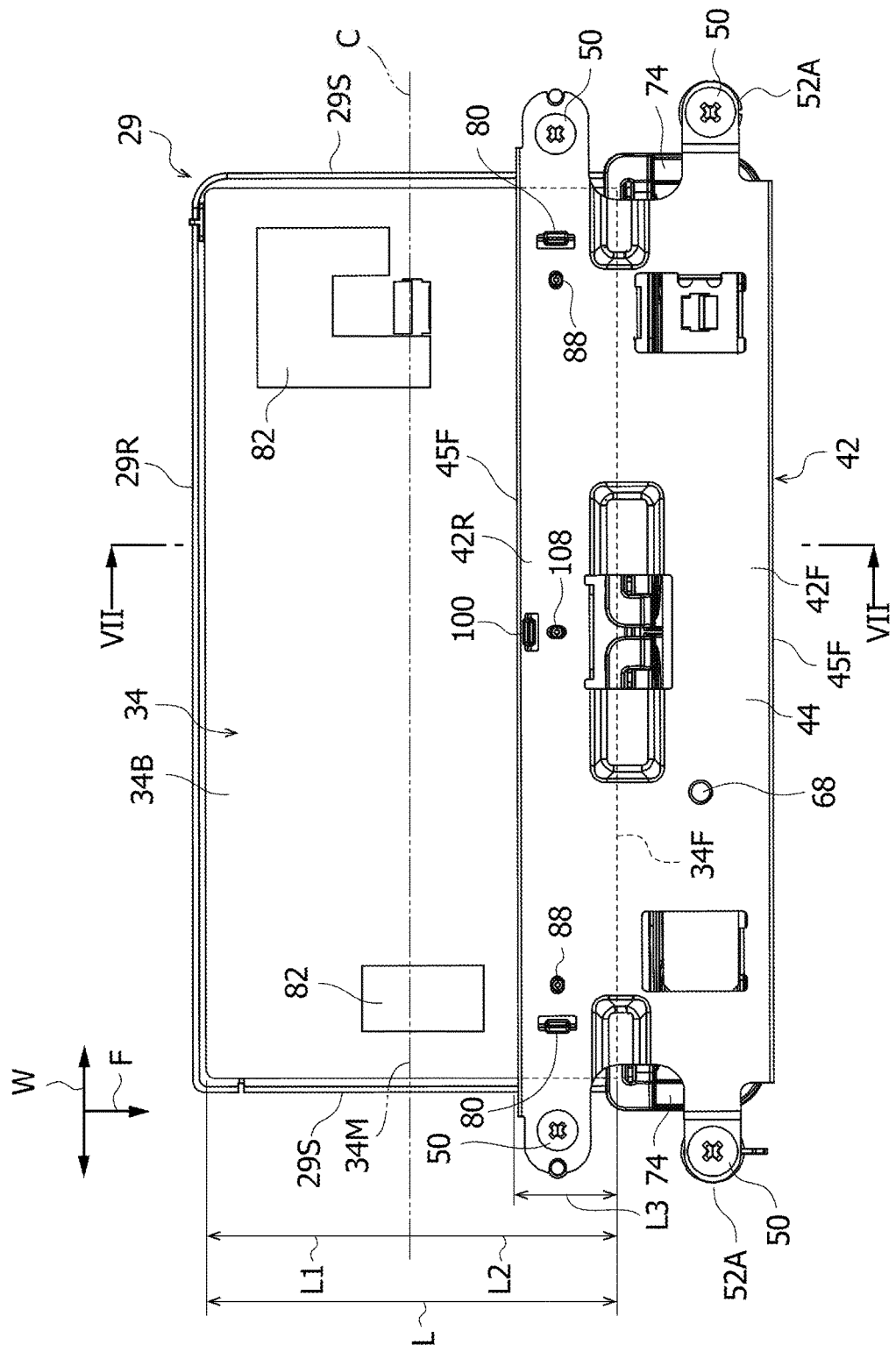
FIG. 6 illustrates an example of a plan view of the touchpad module and the click base as viewed from below.

As illustrated in FIG. 6, the click base 42 is arranged to extend across the touchpad module 34 and the one pair of click buttons 74 when viewed from the thickness direction of the touchpad module 34 (the direction of the arrow U in FIG. 4). The end portion 42R on the touchpad module 34 side of the click base 42 is arranged closer to the one pair of click buttons 74 than a central portion 34M in the vertical side direction of the touchpad module 34 (the direction of the arrow F) when viewed from the thickness direction of the touchpad module 34.

For example, the touchpad module 34 is equally divided into two regions L1 and L2 using, for example, a center line C along the horizontal side direction of the touchpad module 34 as a boundary when viewed from the thickness direction of the touchpad module 34. In this case, the end portion 42R on the touchpad module 34 side of the click base 42 is arranged in the region L2 on the click button 74 side in the touchpad module 34 when viewed from the thickness direction of the touchpad module 34.

For example, L3 may denote a region which extends from an end portion 34F on the click button 74 side of the touchpad module 34 toward the central portion 34M and has a length one-quarter of an entire length L (=L1+L2) in the vertical side direction of the touchpad module 34 when viewed from the thickness direction of the touchpad module 34. In this case, the end portion 42R of the click base 42 is arranged in the region L3 of the touchpad module 34 when viewed from the thickness direction of the touchpad module 34.

Figure 7:
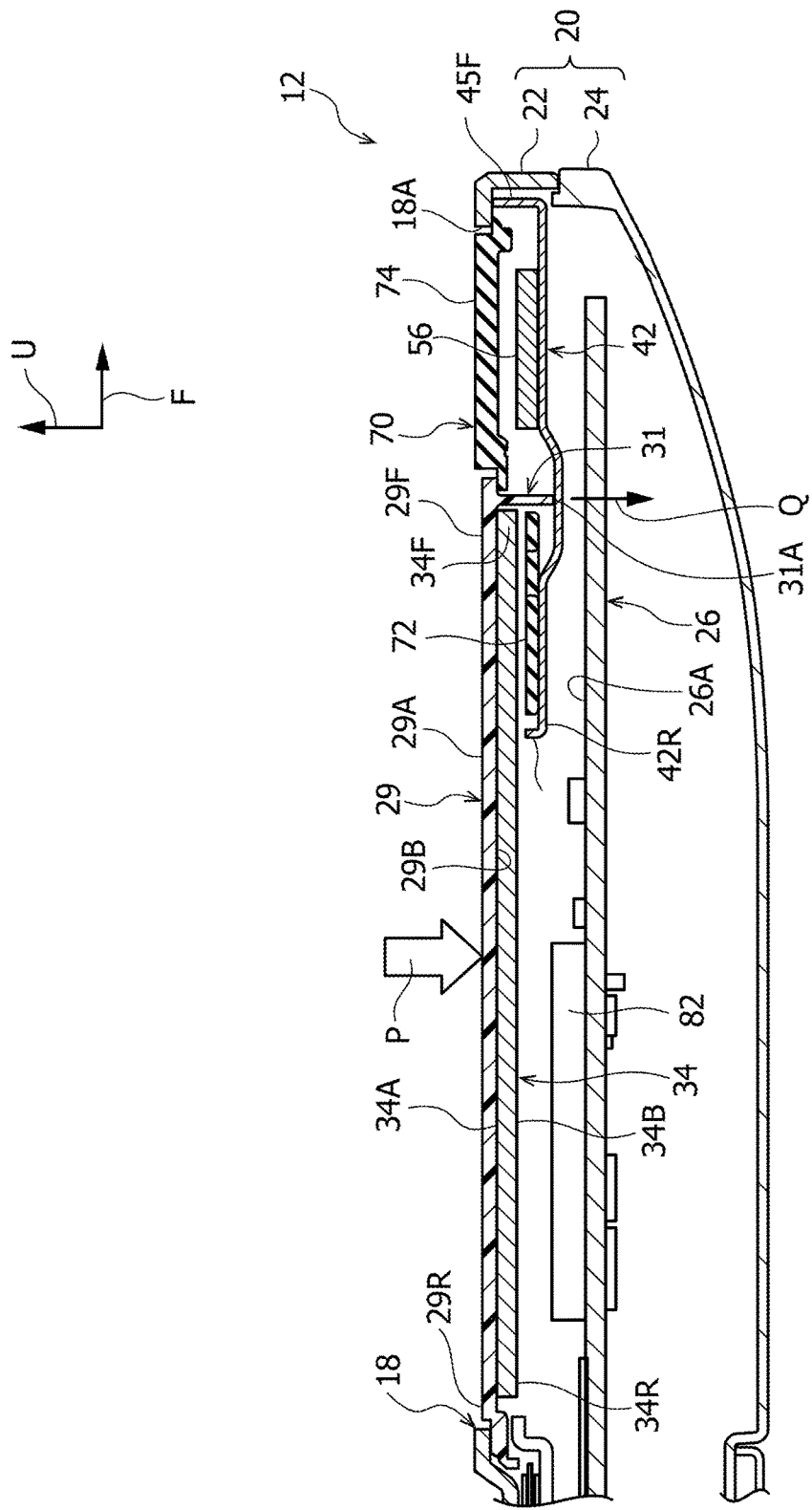
FIG. 7 illustrates a cross-sectional view taken along line VII-VII in FIG. 6.

For this reason, when the touch operation portion 29 is pressed by an operator, as indicated by an arrow P in FIG. 7, the front-side horizontal side portion 29F of the touch operation portion 29 is supported by the click base 42 via the touchpad module 34 and the button base 72.

The printed board 26 described earlier is arranged on the opposite side of the click base 42 from the touchpad module 34. The click base 42 is attached to the upper cover 22 while the click base 42 is separate from the printed board 26. In this state, the click base 42 supports the button member 70 and the touch operation portion 29.

As illustrated in FIG. 3, the upper cover 22 has the cover main body 23 and the cover frame 25. The cover frame 25 is arranged on the reverse face 23L side of the cover main body 23. The cover frame 25 has the touch operation portion 29 made of resin that is touched and operated by an operator. The touch operation portion 29 is arranged so as to cover the opening 18 in the cover main body 23 except the button opening 18A. For example, the button opening 18A is formed along the front-side horizontal side portion 29F of the touch operation portion 29.

As illustrated in FIG. 4, the horizontal side portion 29F on the button opening 18A side in the touch operation portion 29 crosses the opening 18 in the width direction of the upper cover 22 (the direction of the arrow W). For this reason, when the touch operation portion 29 is pressed toward the click base 42 (touched and operated) by an operator, the amount of flexure (the amount of sinking) of the horizontal side portion 29F of the touch operation portion 29 is likely to be larger than that of any other part of the touch operation portion 29, as indicated by a two-dot chain line.

For this reason, for example, an operation portion opening for the touch operation portion 29 and a button opening for the click buttons 74 may be separately formed in the cover main body 23, and the horizontal side portion 29F of the touch operation portion 29 may be supported by a partition portion between the operation portion opening and the button opening.

For example, if two openings, the operation portion opening and the button opening, are formed in the cover main body 23, the palm rest portion 23P of the upper cover 22 may increase in size in the front-back direction. Due to design constraints, it may be difficult to form two openings, the operation portion opening and the button opening, in the cover main body 23.

Figure 8:
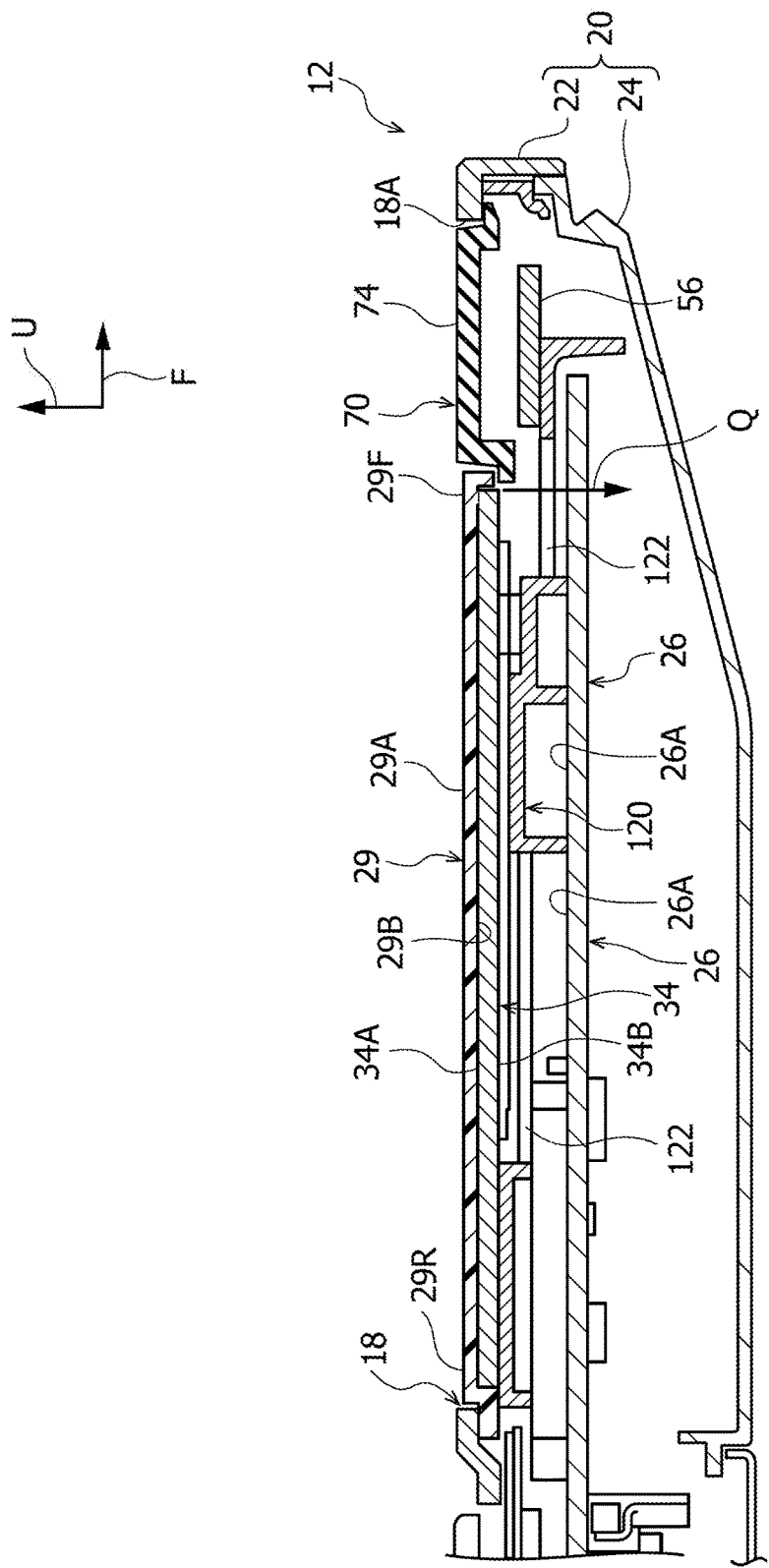
FIG. 8 illustrates an example of a cross-sectional view of a click base corresponding to FIG. 7.

For example, as illustrated in FIG. 8, the reverse face 34B of the touchpad module 34 may be entirely covered by a click base 120. When the touch operation portion 29 is pressed by an operator in this case, the entire reverse face 29B of the touch operation portion 29 is supported by the click base 120 via the touchpad module 34. This may reduce the amount of flexure (an arrow Q) of the horizontal side portion 29F of the touch operation portion 29.

For example, since the reverse face 34B of the touchpad module 34 is entirely covered by the click base 120 in FIG. 8, a mounting region for an electronic component relative to the reverse face 34B may be reduced. A plurality of openings 122 are formed in the click base 120.

In FIG. 8, when the touch operation portion 29 is pressed by an operator, the click base 120 is supported by an obverse face 26A of the printed board 26. Thus, the amount of flexure (the arrow Q) of the horizontal side portion 29F of the touch operation portion 29 may be further reduced.

For example, the click base 120 comes into contact with the obverse face 26A of the printed board 26 in FIG. 8. A mounting region for an electronic component relative to the obverse face 26A of the printed board 26 may be reduced.

For example, as illustrated in FIG. 6, the end portion 42R on the touchpad module 34 side of the click base 42 is arranged in the region L3 on the click button 74 side in the touchpad module 34 when viewed from the thickness direction of the touchpad module 34. The region L3 is set to be a region which extends from the front-side end portion 34F of the touchpad module 34 toward the central portion 34M and has a length one-quarter of the entire length L in the vertical side direction of the touchpad module 34.

For this reason, when the touch operation portion 29 is pressed by an operator, as indicated by, for example, the arrow P in FIG. 7, the horizontal side portion 29F of the touch operation portion 29 is supported by the click base 42 via the touchpad module 34 and the button base 72. Thus, the amount of flexure (the arrow Q) of the horizontal side portion 29F of the touch operation portion 29 may be reduced.

A region except the region L3 of the touchpad module 34 is not covered by the click base 42. Thus, an electronic component may be mounted on the reverse face 34B of the touchpad module 34 in this region.

The mounting region for an electronic component relative to the reverse face 34B of the touchpad module 34 may be increased while the amount of flexure (the amount of sinking) of the horizontal side portion 29F of the touch operation portion 29 is reduced.

As illustrated in FIG. 7, the click base 42 is attached to the upper cover 22 while the click base 42 is separate from the printed board 26. Thus, the mounting region for an electronic component relative to the obverse face 26A of the printed board 26 may be large, as compared to FIG. 8.

The rib portion 31 protruding toward the click base 42 is provided at the horizontal side portion 29F of the touch operation portion 29. The rib portion 31 enhances the rigidity (flexural rigidity) of the horizontal side portion 29F of the touch operation portion 29. Thus, the amount of flexure (the arrow Q) of the horizontal side portion 29F of the touch operation portion 29 may be further reduced.

The distal end portion 31A in the protruding direction of the rib portion 31 is brought into contact with the click base 42 when the touch operation portion 29 is pressed by an operator. With this contact, the horizontal side portion 29F of the touch operation portion 29 is supported by the click base 42 via the rib portion 31. Thus, the amount of flexure (the arrow Q) of the horizontal side portion 29F of the touch operation portion 29 may be further reduced.

The one pair of front-side fixed portions 46A of the click base 42 is fixed to the one pair of front-side boss portions 52A arranged on two sides, in the horizontal side direction of the touch operation portion 29, of the button opening 18A. The one pair of rear-side fixed portions 46B of the click base 42 is fixed to the one pair of rear-side boss portions 52B arranged on two sides in the horizontal side direction of the touch operation portion 29.

As described above, the one pair of rear-side fixed portions 46B of the click base 42 is fixed to the upper cover 22 on the two sides in the horizontal side direction of the touch operation portion 29. With this configuration, the horizontal side portion 29F of the touch operation portion 29 may be efficiently supported by the click base 42. Thus, the amount of flexure of the horizontal side portion 29F of the touch operation portion 29 may be further reduced.

As compared to FIG. 8, the click base 42 is smaller. The information processing apparatus 10 is thus downsized. Since the mounting region for the electronic component 82 relative to the reverse face 34B of the touchpad module 34 is larger, for example, the degree of freedom of the layout of connectors to be mounted on the reverse face 34B of the touchpad module 34 may be improved. For example, a connector may be laid out on the reverse face 34B of the touchpad module 34 in view of the work efficiency of the work of connecting a cable to a connector. Thus, the ease of assembly of the touchpad module 34 may be improved. Since the degree of freedom of the layout of connectors on the reverse face 34B of the touchpad module 34 improves, the length of a cable to be connected to a connector may be shortened. Thus, the cost of cables may be reduced.

The end portion 42R on the touchpad module 34 side of the click base 42 may be arranged in the region L3 on the click button 74 side of the touchpad module 34 when viewed from the thickness direction of the touchpad module 34. The end portion 42R on the touchpad module 34 side of the click base 42 may be arranged closer to the one pair of click buttons 74 than the central portion 34M in the vertical side direction of the touchpad module 34 when viewed from the thickness direction of the touchpad module 34. In this case, for example, a range of support (a support region) of the reverse face 34B of the touchpad module 34 by the click base 42 may increase while the mounting region for an electronic component relative to the reverse face 34B of the touchpad module 34 decreases. Thus, the amount of flexure (the arrow Q) of the horizontal side portion 29F of the touch operation portion 29 may be more effectively reduced.

By way of example, end portions along a longitudinal direction of the touch operation portion 29 may be horizontal side portions 29F and 29R, and end portions along a lateral direction of the touch operation portion 29 may be vertical side portions 29S. For example, end portions along the lateral direction of the touch operation portion 29 may be horizontal side portions, and end portions along the longitudinal direction of the touch operation portion 29 may be vertical side portions.

Although the click base 42 is attached to the upper cover 22 while the click base 42 is separate from the printed board 26, the click base 42 may be attached to the upper cover 22 while the click base 42 is in contact with the printed board 26. For example, the click base 42 may be supported by the printed board 26.

The distal end portion 31A of the rib portion 31 may come into contact with the click base 42. For example, a gap may be created between the distal end portion 31A of the rib portion 31 and the click base 42, and the distal end portion 31A of the rib portion 31 may come into contact with the click base 42 when the touch operation portion 29 is pressed by an operator. The rib portion 31 may be appropriately omitted.

The click base 42 may be fixed to the upper cover 22 with the screws 50 at the one pair of front-side fixed portions 46A and the one pair of rear-side fixed portions 46B. The click base 42 may be fixed to the upper cover 22 through, for example, bonding or welding. A position where the click base 42 is fixed to the upper cover 22 may be appropriately changed. The click base 42 may be attached to the lower cover 24 instead of being attached to the upper cover 22.

The click base 42 may be made of metal or may be made of, for example, resin. The switch 58 is not limited to a tactile switch, and any other switch may be used. An operation button is not limited to the click button 74, and any other operation button may be used.

The touch operation portion 29 and the touchpad module 34 are applied to the information processing apparatus 10 that is a notebook-size personal computer. The touch operation portion 29 and the touchpad module 34 may be applied to any other information processing apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
   a body device having one side and other side opposite to each other in a first direction;
   a display device coupled pivotably to the one side of the body device;
   a cover including:
      a cover main body, the cover main body including:
         a plurality of key openings to expose a plurality of keytops from the cover main body; and
         a palm rest with an opening at the other side of the body device; and
      a cover frame provided under the cover main body, the cover frame including:
         a frame extending around an outer periphery of the cover main body; and
         a panel member under the palm rest portion of the cover main body, the panel member including a touch operation plate at a central portion in a longitudinal direction of the panel member;

an operation button arranged in the opening provided in the cover main body;

a touchpad module provided under the panel member so that an upper surface of the touchpad module is in contact with a bottom surface of the touch operation plate;

a base member arranged under the touchpad module and the operation button, the base member being configured to support the touchpad module and the operation button, an end of the base member under the touchpad module being arranged closer to the operation button than a central portion of the touchpad module in the first direction when viewed from a thickness direction of the touchpad module; and a printed board arranged on an opposite side of the touchpad module with respect to the base member, wherein the base member supports the touchpad module and the operation button which the base member is separate from the printed board.

2. The information processing apparatus according to claim 1, wherein a rib that protrudes toward the base member is provided at the bottom surface of the touch operation plate.

3. The information processing apparatus according to claim 2, wherein a distal end in a protruding direction of the rib is in contact with the base member.

4. The information processing apparatus according to claim 1, wherein the touch operation plate is a part of the cover frame, and the touch operation plate is exposed via the opening.

5. The information processing apparatus according to claim 4, wherein the touch operation plate crosses the opening.

6. The information processing apparatus according to claim 1, wherein the cover main body includes metal, and the touch operation plate includes resin.

7. The information processing apparatus according to claim 1, wherein the end of the base member under the touchpad module is arranged in a region that extends from an edge of the touch pad module located directly adjacent to the operation button toward the central portion, and a length in the first direction of the region has one-quarter of a length in the first direction of the touchpad module when viewed from the thickness direction of the touchpad module.

8. The information processing apparatus according to claim 1, wherein the base member is arranged to extend across the touchpad module and the operation button and is attached to the cover.

9. The information processing apparatus according to claim 1, wherein the base member includes:

first fixed portions fixed to the cover on two sides, respectively, in a first side of the touchpad module, and second fixed portions fixed to the cover on two sides, respectively, in a second side of the touchpad module opposite to the first side.

10. The information processing apparatus according to claim 1, wherein the touch operation plate is formed in a rectangular shape when viewed from the thickness direction of the touch operation plate.

11. The information processing apparatus according to claim 1, wherein the upper surface of the touchpad module is bonded to the bottom surface of the touch operation plate.

12. The information processing apparatus according to claim 1, wherein the operation button includes a pair of buttons arranged side by side in the button opening.

13. The information processing apparatus according to claim 1, wherein the operation button includes a click button.

14. The information processing apparatus according to claim 1, wherein the end of the base member under the touchpad module positions around a portion from a side of the touchpad module over the base member by a length one-quarter of a length of the touchpad module in the first direction.

* * * * *